United States Patent
Brown et al.

(10) Patent No.: US 7,716,311 B2
(45) Date of Patent: May 11, 2010

(54) METHOD AND APPARATUS FOR MONITORING OF SWITCH RESOURCES USING RESOURCE GROUP DEFINITIONS

(75) Inventors: Thomas W. Brown, Jackson, NJ (US); John E. De La Cruz, Matawan, NJ (US); James L. Knight, Jr., Matawan, NJ (US); Patrick G. Maggiulli, Middletown, NJ (US); James Leo Murtaugh, Holmdel, NJ (US); Richard J. Pennenga, East Windsor, NJ (US); Steven Michael Silverstein, West Long Branch, NJ (US); Linda G. Smith, Marlboro, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1161 days.

(21) Appl. No.: 10/261,433

(22) Filed: Sep. 30, 2002

(65) Prior Publication Data

US 2004/0064549 A1   Apr. 1, 2004

(51) Int. Cl.
- *G06F 15/173* (2006.01)
- *H04M 3/42* (2006.01)
- *H04M 5/00* (2006.01)
- *H04M 3/00* (2006.01)

(52) U.S. Cl. .................. 709/223; 709/224; 709/225; 379/204.01; 379/265.13; 379/266.02

(58) Field of Classification Search ......... 709/223–225; 379/204.01, 243, 265.13, 266.02
See application file for complete search history.

(56) References Cited

U.S. PATENT DOCUMENTS 5,796,951 A * 8/1998 Hamner et al. ............. 709/223
5,875,234 A * 2/1999 Clayton et al. ........... 379/93.05
6,049,819 A * 4/2000 Buckle et al. ............... 709/202
6,233,236 B1 * 5/2001 Nelson et al. ............... 370/359
6,249,576 B1 * 6/2001 Sassin et al. ........... 379/218.01

(Continued)

OTHER PUBLICATIONS

Genesys Telecommunications Laboratories, T-Server Release 5.1.5 Developer's Guide, pp. 1-105, 1999.

(Continued)

*Primary Examiner*—Larry Donaghue
*Assistant Examiner*—Asghar Bilgrami
(74) *Attorney, Agent, or Firm*—Joseph B. Ryan; Jason Paul DeMont; Wayne S. Breyer (57) ABSTRACT

Resources associated with a communication system switch are monitored by storing information defining one or more resource groups. Each of the resource groups includes multiple identifiers, with each of the identifiers specifying at least one resource to be monitored. A client external to the switch is permitted to select at least one of the resource groups for monitoring. In response to selection of one of the groups by the client, monitoring of the corresponding resources is established on behalf of the client. The resource monitoring may be established, controlled and maintained by a telephony server coupled between the client and the switch. Such a telephony server can preserve monitoring for a resource group, independent of the requests of clients, in order to reduce the amount of execution time needed to set up and tear down monitors for client applications. This is particularly advantageous in call centers or in other client applications that involve monitoring large numbers of switch resources.

13 Claims, 3 Drawing Sheets

U.S. PATENT DOCUMENTS

| | | | |
|---|---|---|---|
| 6,363,421 B2 * | 3/2002 | Barker et al. | 709/223 |
| 6,404,857 B1 * | 6/2002 | Blair et al. | 379/67.1 |
| 6,453,039 B1 * | 9/2002 | Cutting et al. | 379/265.11 |
| 6,473,398 B1 * | 10/2002 | Wall et al. | 370/229 |
| 6,477,246 B1 * | 11/2002 | Dolan et al. | 379/211.02 |
| 6,480,597 B1 * | 11/2002 | Kult et al. | 379/242 |
| 6,601,101 B1 * | 7/2003 | Lee et al. | 709/227 |
| 6,681,001 B1 * | 1/2004 | Clayton et al. | 379/93.05 |
| 6,731,729 B2 * | 5/2004 | Eng et al. | 379/121.03 |
| 6,751,663 B1 * | 6/2004 | Farrell et al. | 709/224 |
| 6,947,154 B2 * | 9/2005 | Kikuchi | 358/1.1 |
| 7,020,263 B2 * | 3/2006 | Bauer et al. | 379/219 |
| 7,023,979 B1 * | 4/2006 | Wu et al. | 379/265.11 |
| 7,142,650 B1 * | 11/2006 | Kult et al. | 379/112.01 |
| 7,564,840 B2 * | 7/2009 | Elliott et al. | 370/356 |
| 2003/0086556 A1 * | 5/2003 | Welch et al. | 379/265.09 |
| 2003/0235282 A1 * | 12/2003 | Sichelman et al. | 379/201.03 |
| 2004/0249650 A1 * | 12/2004 | Freedman et al. | 705/1 |
| 2005/0207557 A1 * | 9/2005 | Dolan et al. | 379/210.02 |
| 2006/0227957 A1 * | 10/2006 | Dolan et al. | 379/212.01 |

OTHER PUBLICATIONS

Avaya™ CentreVu® Computer-Telephony, "Programmer's Guide for DEFINITY® Enterprise Communications Server," Release 11.1, Version 1, TSAPI Version 2, Private Data Version 6, 95 pages, May 2002.

ECMA Standardizing Information and Communication Systems, Services for Computer Supported Telecommunications Applications (CSTA) Phase III, Standard ECMA-269, 4th Edition, pp. 1-32, Jun. 2000.

"The JAIN™ APIs: Integrated Network APIs for the Java™ Platform," http://java.sun.com/products/jain/, pp. 1-26, May 2002.

* cited by examiner

METHOD AND APPARATUS FOR MONITORING OF SWITCH RESOURCES USING RESOURCE GROUP DEFINITIONS

FIELD OF THE INVENTION

The invention relates generally to the field of enterprise communication platforms and other types of communication system switches, and more particularly to the monitoring of resources associated with a communication system switch.

BACKGROUND OF THE INVENTION

Examples of conventional communication system switches include private branch exchanges (PBXs) and automatic call distribution (ACD) systems. As is well known, such switches may be controlled via computer-telephony integration (CTI) applications running on computers internal or external to the corresponding enterprise communication platform. CTI applications are commonly used in call centers and other enterprise call processing contexts.

An important function of CTI applications in these contexts involves the monitoring of switch resources. For example, most CTI applications require information regarding dynamic telephony activity for specific enterprise communication platform resources, such as agent terminals and other system endpoints, ACD devices, etc. The CTI applications use this information to make most effective use of the monitored resources in processing incoming and outgoing calls. Current CTI application programming interfaces (APIs), such as Telephony Services Application Programming Interface (TSAPI), Java Telephony Application Programming Interface (JTAPI) and Telephony Application Program Interface (TAPI), and their associated protocols each provide a mechanism for a CTI application to request notification of any activity involving a particular telephony resource.

In a typical conventional resource monitoring arrangement, the CTI application first sets up a communication session with an enterprise communication platform, often through a corresponding gateway device. As part of this session, the CTI application supplies any required authentication information. The CTI application then sends a series of resource monitor requests, generally one request per resource on the targeted platform. Activity events involving the monitored telephony resources are communicated to the waiting application within the established session.

Unfortunately, there are a number of significant problems with the conventional resource monitoring approach described above. For example, the above-noted example CTI APIs typically require that resource monitoring requests be issued one at a time, resulting in an unduly complex arrangement when there are a large number of resources to monitor. Moreover, since each CTI application is responsible for generating its own individual resource monitoring requests, redundant lists of monitored resources may be present in different CTI applications, or one or more of the lists may be inconsistent with the actual resources present at any given time in the enterprise communication platform. Yet another problem is that the individual resource monitoring requests typically have to be regenerated each time a given CTI application is restarted, which can result in excessive execution time. As a more particular example, a CTI application running on a client machine may crash, in which case existing monitoring arrangements will be terminated and must be reestablished, at the cost of additional execution time.

Existing API function calls fail to provide an adequate solution to one or more of the problems identified above. These example function calls include the Genesys T-Library API call TRegisterAll, described in the T-Server 5.1.5 Developer's Guide, Chapter 3, "Feature Requests," p. 85, which registers a CTI application to receive events regarding all telephony "objects" associated with a given CTI link, and the JAIN™ Call Control (JCC) API call CreateEventFilterAddress*( ), described at http://java.sun.com/products/jain, which allows the specification of event filters.

Other similarly-deficient techniques are described in, for example, ECMA 269, Services for Computer Supported Telecommunications (CSTA) Phase III, Fourth Edition, June, 2000, http://www.ecma.ch, Sections 6.1.3.4.3, 6.1.3.4.5 and 6.1.3.6. See also ISO/IEC 18051:2000(E) International Standard, Information technology—Telecommunications and information exchange between systems—Services for Computer Supported Telecommunications Applications (CSTA) Phase III, Jul. 15, 2000.

As is apparent from the foregoing, a need exists for an improved approach to monitoring of switch resources via CTI applications or other monitoring mechanisms.

SUMMARY OF THE INVENTION

The present invention overcomes one or more of the above-noted problems by providing improved techniques for monitoring switch resources.

In accordance with one aspect of the invention, resources associated with a communication system switch are monitored by storing information defining one or more resource groups. Each of the resource groups includes multiple identifiers, with each of the identifiers specifying at least one resource to be monitored. A client is permitted to select at least one of the resource groups for monitoring. In response to selection of one of the groups by the client, monitoring of the corresponding resources is established on behalf of the client.

In an illustrative embodiment of the invention, the resource monitoring is established, controlled and maintained by a telephony server coupled between the client and the switch. More particularly, the telephony server includes a resource monitor for permitting the selection of the resource group by the client and controlling the monitoring of the corresponding resources on behalf of the client. The resource group definitions are stored such that the one or more defined resource groups are selectable by each of a number of different clients external to the switch. The selection of one of the defined resource groups may be implemented via a computer-telephony integration (CTI) application running on the client.

In accordance with another aspect of the invention, the resource groups may each be stored with one or more attributes specifying the manner in which the monitoring is to be implemented. For example, a given attribute may indicate that the corresponding resource group will be set up for monitoring prior to selection of the group by the client. Another attribute may indicate that the monitoring of the corresponding resource group will continue even if the requesting client fails. Yet another attribute may indicate that the monitoring of the corresponding resource group will continue even if the requesting client indicates that it no longer requires the monitoring.

In accordance with a further aspect of the invention, the identifiers associated with a given one of the resource groups may be determined in response to a parameterized query based on a description of at least one characteristic of the group.

Advantageously, the present invention provides particularly efficient techniques for monitoring multiple diverse communications platforms on behalf of numerous, otherwise unrelated clients. The invention can be configured to provide a consistent interface for the clients, and centralized negotiation, control and maintenance of resource monitoring relationships. Moreover, the time required to establish the monitoring on behalf of clients is considerably reduced, particularly for applications monitoring large numbers of resources and upon failure and restart of clients or client applications.

DETAILED DESCRIPTION OF THE INVENTION

Although the invention will be illustrated below in conjunction with an exemplary communication system, it is not limited to use with any particular configuration of system elements or communication processing application. Those skilled in the art will recognize that the disclosed techniques may be used in any communication system or communication processing application in which it is desirable to provide improved monitoring of resources associated with a communication system switch. For example, the disclosed techniques can be used in any communication system which includes a private-branch exchange (PBX), an automatic call distribution (ACD) device, as well as portions or combinations of these and other types of communication system switches.

The term "call" as used herein is intended to be construed broadly so as to encompass not only incoming or outgoing telephone calls but also other types of communications such as voiceover-IP (VoIP) communications, session initiation protocol (SIP) communications, data transmissions, e-mail, facsimile, chat sessions, instant messaging, etc.

Figure 1:
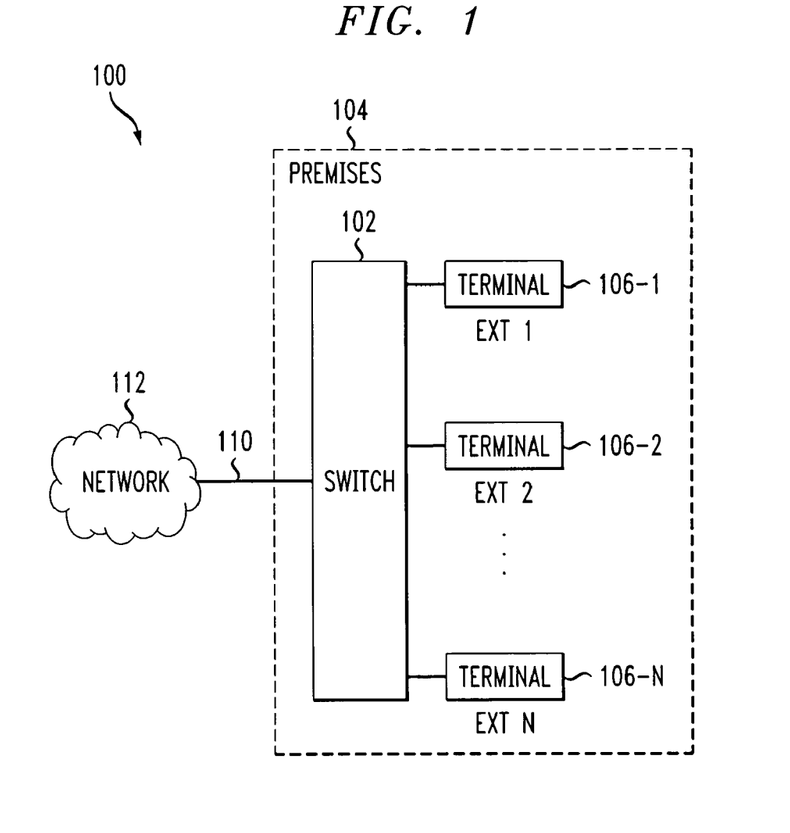
FIG. 1 shows an exemplary communication system in which the invention is implemented.

FIG. 1 shows an exemplary communication system 100 in which the invention is implemented. The system 100 includes a switch 102 which serves a premises 104 having a number of terminals 106-1, 106-2, . . . 106-N. Each of the terminals 106-1, 106-2, . . . 106-N corresponds to one of a set of internal extensions Ext1, Ext2, . . . ExtN as shown. These extensions are referred to herein as "internal" in that they are extensions within the premises 104 that are directly serviced by the switch. More particularly, these extensions correspond to conventional terminal endpoints serviced by the switch, and the switch can direct incoming calls to and receive outgoing calls from these extensions in a conventional manner.

In a call center application of the system 100, each of the terminals 106-1, 106-2, . . . 106-N may correspond to an agent workstation. Such a workstation may comprise a computer having telephony capability, a telephone station with an associated video display terminal, etc.

Although switch 102 is shown as associated with the premises 104 in this embodiment, the invention does not require that the switch 102 be so configured. Alternatively, the switch 102 may be implemented as a distributed switch which includes switch processing elements at multiple locations, networked together in a conventional manner.

The term "switch" as used herein should be understood to include a PBX, an enterprise switch, or other type of communications system switch, as well as other types of processor-based communication control devices such as servers, computers, routers, adjuncts, etc., including a distributed switch such as that referred to above.

By way of example, the switch 102 in the illustrative embodiment may be implemented as an otherwise conventional DEFINITY® Enterprise Communication Service (ECS) communication system switch, available from Avaya Inc. of Basking Ridge, N.J., USA. Details regarding conventional aspects of the DEFINITY® ECS may be found in the DEFINITY® ECS Administrator's Guide, Release 9, Document No. 555-233-506. Other types of known switches may also be used. The conventional aspects of such switches are well known in the art and therefore not described in detail herein.

Another example switch suitable for use in conjunction with the present invention is the MultiVantage™ communication system switch, also available from Avaya Inc.

The terminals 106 may be wired desktop telephone terminals or any other type of terminals capable of communicating with the switch 102. The word "terminal" as used herein should therefore be understood to include not only wired or wireless desktop telephone terminals, but also other types of processor-based communication devices, including but not limited to mobile telephones, personal computers, SIP endpoints, personal digital assistants (PDAs), etc.

It is to be appreciated that such terminals are to be viewed as examples of resources, associated with a communication system switch, that are monitorable in accordance with the techniques of the invention. The invention, however, can be used with any of a wide variety of other monitorable resources.

The term "resource" as used herein is therefore intended to include, by way of example and without limitation, any object, feature or function associated with the terminals 106 or switch 102, for which the switch provides an indication that it will report changes or other activity involving that object, feature or function. Such resources are more generally referred to herein as being "associated with" the switch 102. More particular examples of monitorable resources corresponding to switch-administered objects include, without limitation, terminals, agents, ACD devices, vector dialed numbers (VDNs), actual or virtual extensions, trunk lines, etc. More particular examples of monitorable resources corresponding to switch features or functions include, without limitation, terminal message waiting indicators, extension call forwarding settings, etc.

Referring again to FIG. 1, the switch 102 is also coupled via one or more trunk lines 110 to a network 112. The network 112 may comprise, e.g., a public switched telephone network (PSTN). The trunk lines 110 carry incoming calls from the network 112 to the switch 102 for processing, and carry outgoing calls from the switch 102 to the network 112. The network 112 may also or alternatively comprise a wide area computer network such as the Internet, a local area network, a metropolitan area network, a wireless cellular network, a satellite network, as well as portions or combinations of these and other networks.

It should be noted that the invention does not require any particular type of information transport media between switch 102, network 112 and terminals 106, i.e., the invention may be implemented with any desired type of transport medium as well as combinations of different types of transport media.

The switch 102 may be connected to one or more external endpoints, e.g., external terminals or system processing elements, via network 112 or other suitable communication channel(s).

The system 100 may also include one or more SIP terminals, SIP applications or other SIP endpoints, connected to switch 102 or arranged elsewhere in the system 100, internal or external to the premises 104. Such SIP endpoints are considered resources that can be monitored using the techniques of the invention.

It should also be emphasized that the configuration of the switch, user terminals and other elements as shown in FIG. 1 is for purposes of illustration only, and should not be construed as limiting the invention to any particular arrangement of elements.

Figure 2:
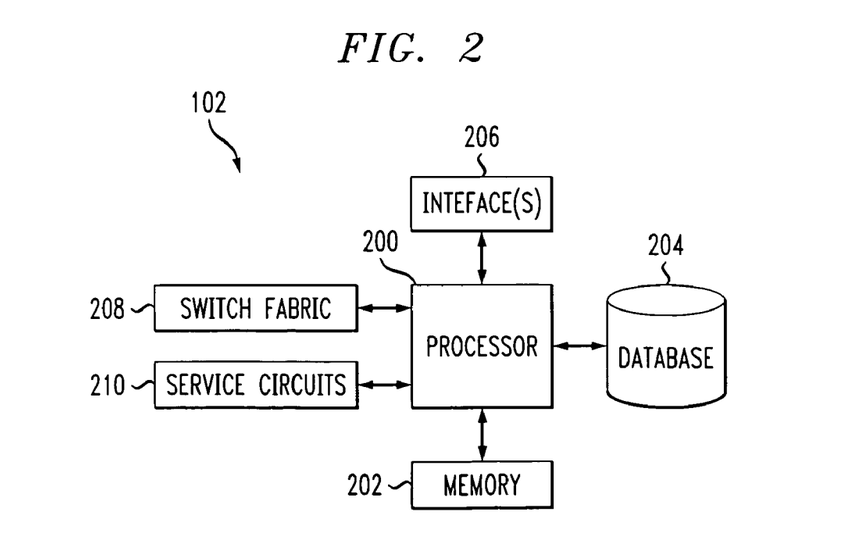
FIG. 2 is a block diagram showing one possible implementation of a switch of the FIG. 1 system.

FIG. 2 shows a more detailed view of one possible implementation of the switch 102 in the system of FIG. 1. The switch 102 in this implementation includes a processor 200, a memory 202, a database 204, one or more interfaces 206, a switch fabric 208, and a set of service circuits 210. The processor 200 may be implemented as a central processing unit (CPU), microprocessor, application-specific integrated circuit (ASIC) or other type of digital data processor, as well as various portions or combinations of such elements. The memory 202 may be a random access memory (RAM), a read-only memory (ROM) or combinations of these and other types of electronic memory devices.

The processor 200 operating in conjunction with the memory 202 executes one or more software programs for providing call processing functions within the switch 102. Such programs may be stored in memory 202 or another storage device accessible to the switch 102 and executed by processor 200 in a conventional manner.

The database 204 may be, e.g., an optical or magnetic disk-based storage device, or other conventional storage device associated with or otherwise accessible to the switch 102. The database 204 may be used to store, e.g., feature assignments to particular feature buttons or codes, directory number assignments to corresponding call appearances or direct facility termination keys, access restrictions, and other administrative information regarding the configuration of the system 100, as well as other types of information.

Database 204 may be made accessible to particular system elements, so as to provide customer control of at least a portion of the database contents. For example, such a portion could contain customer-proprietary data. Other combinations and configurations of internal and external databases or other storage devices could be used.

The service circuits 210 may include tone generators, announcement circuits, etc. These circuits and the interfaces 206 are controlled by processor 200 in implementing call processing functions in the switch 102.

The switch 102 may include additional elements which are omitted from FIG. 2 for simplicity and clarity of illustration. For example, the switch may include a port card for each type of user terminal associated therewith. In addition, it will be appreciated by those skilled in the art that the switch 102 may be configured to support multiple user terminals of different types, e.g., wired deskset terminals, wireless deskset terminals, personal computers, video telephones or other advanced terminals, etc.

Also associated with the switch 102 may be an administrator terminal (not shown) which is used to program the operation of the switch 102 during a system administration, e.g., an initial set-up and configuration of the system or a subsequent system-level or user-level reconfiguration.

Other devices not shown in FIGS. 1 and 2 may be associated with the switch 102, such as an adjunct feature server. Such an adjunct may be physically incorporated within the switch, and may be partially or completely implemented using other switch elements such as processor 200 and memory 202. By way of example, an adjunct feature server may correspond to a given one of the clients 302 to be described in conjunction with FIG. 3.

The present invention in accordance with one aspect thereof provides improved resource monitoring in the system 100 of FIG. 1 as well as other switch-based communication systems. More particularly, the invention in the illustrative embodiment to be described below in conjunction with FIGS. 3 through 5 allows different client machines to initiate resource monitoring in a particularly efficient manner via a telephony server coupled between one or more of the clients and the switch 102.

Figure 3:
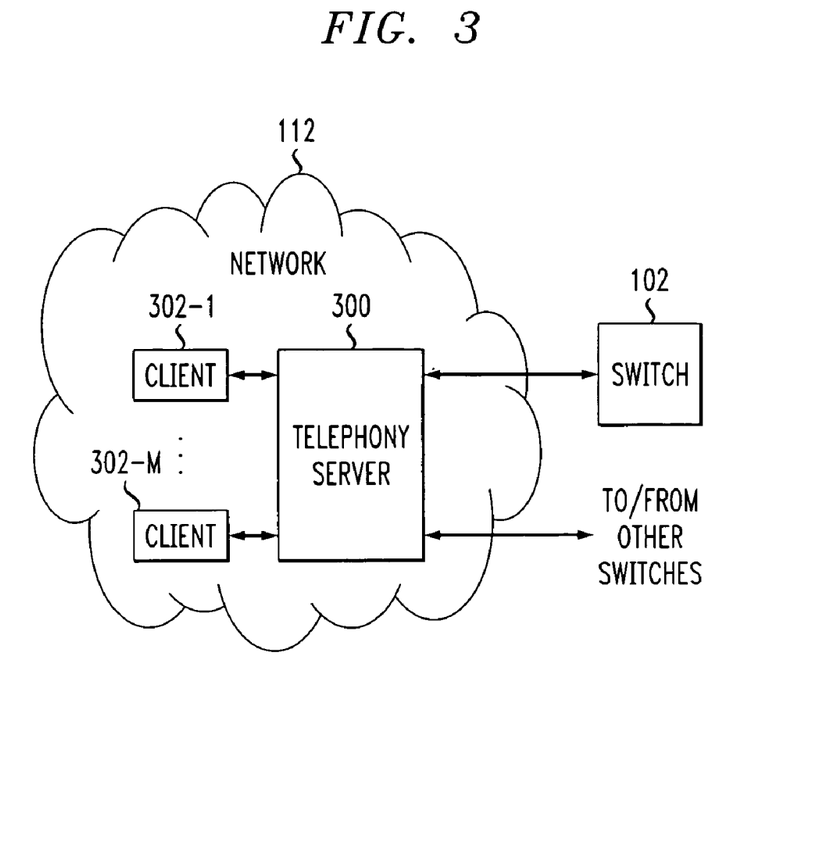
FIG. 3 illustrates the connection of the switch in the FIG. 1 system to a telephony server configured in accordance with the present invention.

With reference now to FIG. 3, the network 112 of FIG. 1 is shown as including or otherwise having associated therewith a telephony server 300 coupled to a set of M client machines denoted 302-1, 302-2, . . . 302-M. The telephony server 300 is also coupled to the switch 102, and may be coupled to one or more additional switches which are not explicitly shown in the figure. Although the telephony server 300 and the clients 302 are shown as elements of the network 112 in this illustration, this is by way of example only, and numerous other interconnections of the client, server and switches are possible.

In addition, although the telephony server 300 is shown as being separate from the switch 102 in FIG. 2, it may in other embodiments of the invention be incorporated in whole or in part into a given switch platform. The telephony server 300 may therefore be within the premises 104 serviced by the switch 102, rather than external to that premises as in the FIG. 3 embodiment.

In addition, the telephony server 300 may be configured for use in conjunction with the monitoring of other resources associated with the switch, such as SIP telephones or other SIP endpoints, as well as other suitable monitoring domains.

Events, updates and other information regarding monitored resources may be returned from the switch 102 to the telephony server 300, and from the telephony server 300 to the requesting client or client application.

Figure 4:
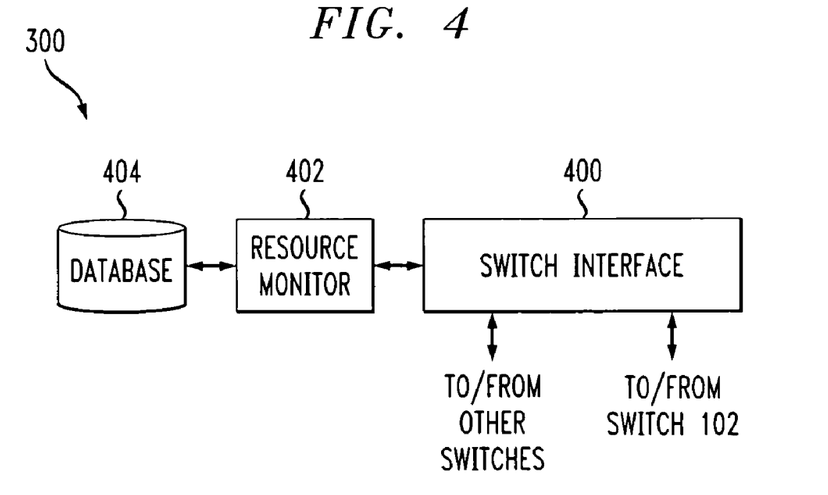
FIG. 4 is a block diagram showing one possible configuration of the telephony server of FIG. 3.

FIG. 4 shows a more detailed view of one possible configuration of the telephony server 300. In this implementation, the telephony server 300 includes a switch interface 400, a resource monitor 402, and a database 404. The telephony server 300 may be implemented as an otherwise conventional server having processor and memory elements. The switch interface 400 may be implemented in a conventional manner using any of a variety of techniques well-known to those skilled in the art.

The telephony server 300 may represent a single server or a server farm, cluster or other arrangement of multiple servers. By way of example, a multiple server implementation may be based on the Java 2 Platform, Enterprise Edition (J2EE).

An example telephony server suitable for use in conjunction with the present invention is the Avaya Computer Telephony (ACT) Telephony Server, available from Avaya Inc. of Basking Ridge, N.J., USA. Details regarding the ACT Telephony Server can be found in, e.g., the CentreVu® Programmer's Guide for DEFINITY® Enterprise Communications Server, Release 11.1, Version 1, TSAPI Version 2, Private Data Version 6, Issue 1, May 2002, which is incorporated by reference herein.

The resource monitor 402 is preferably implemented primarily in the form of software executable by one or more processors of the telephony server 300. For example, the resource monitor 402 may be implemented as "middleware" residing in one or more memory elements within or otherwise accessible to the telephony server 300. Such middleware may be viewed as residing between an operating system of the telephony server 300 and one or more applications that run on or otherwise access or interact with the server 300. The resource monitor 402 performs functions that are described below in conjunction with the flow diagram of FIG. 5.

The database 404 may represent one or more storage devices or other memory elements of the telephony server, such as an electronic, magnetic or optical storage medium, or portions or combinations thereof.

Figure 5:
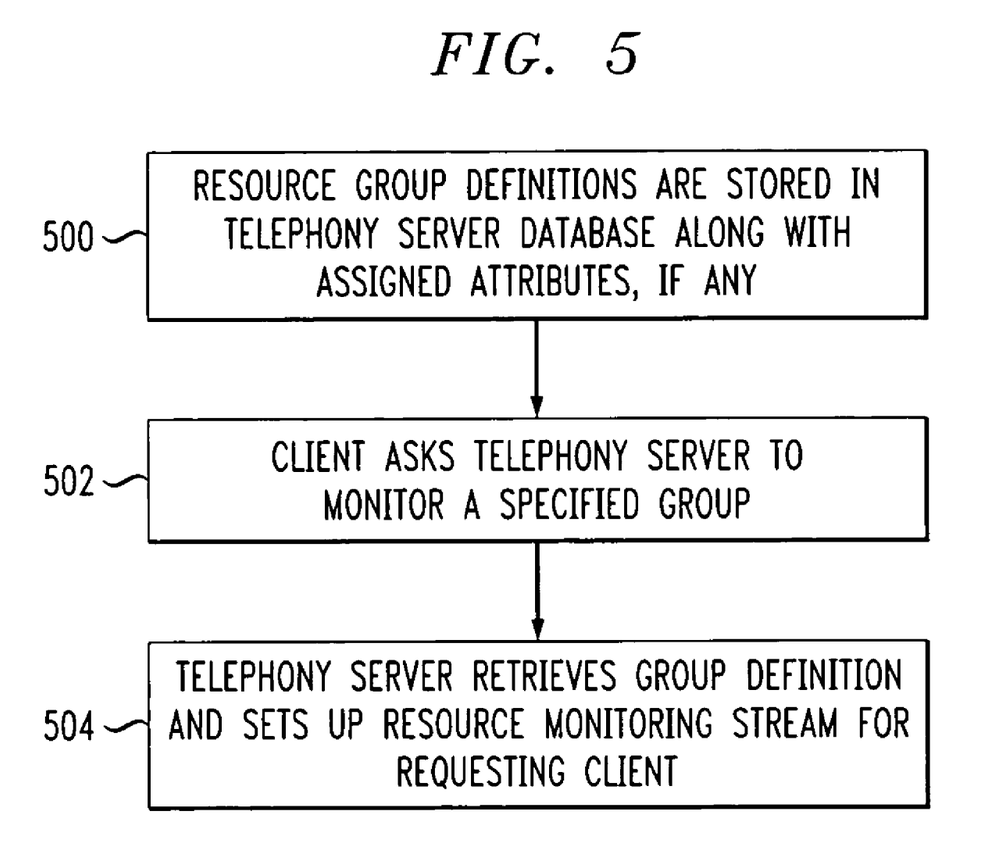
FIG. 5 is a flow diagram of an exemplary resource monitoring stream process implemented in the FIG. 1 system in accordance with the present invention.

Referring now to the flow diagram of FIG. 5, in step 500 a number of resource group definitions are stored in the telephony server database 404. The group definitions are stored along with assigned attributes, if any, as will be described below. Each of the resource group definitions stored in step 500 comprises information defining a group of switch resources to be monitored. The information comprises multiple resource identifiers, with each of the identifiers specifying at least one switch resource to be monitored.

A given resource may be identified by a simple resource name, such as the particular extension Ext1, Ext2, . . . ExtN associated with a corresponding one of the terminals 106, a vector dialed number (VDN), an agent or agent skill number, or other identifier. Standardized directory services may be used to associate descriptive attributes with the resource identifiers, e.g., DNtype="sales vector" where DN denotes dialed number, or agentskill="speaks spanish."

A resource group may be defined simply as a list of resource identifiers, defined as the result of a flexible query, e.g., one based on associated descriptive attributes, or defined in another suitable manner.

By way of example, a flexible query may be initiated by a client or client application. Such a query could be implemented to provide a bulk upload of resource identifiers in which all identifiers for a given group are returned in response to a single query, or an enumerator upload in which the identifiers are determined and returned a few at a time. The queries may be configured in accordance with well-known structured query language (SQL) techniques.

A flexible query may be a parameterized query. In an illustrative implementation, one could define a query parameter and then list the category values that should be associated with the corresponding stream description. For example, for a query parameter "DN campaign type" the list could include the two values "Ski Pants Special DN" and "Ski Boots Sale DN" for particular sales campaigns rather than lists of dialed numbers associated with those sales campaigns. A switch administration database could include "DN campaign type" information for each dialed number, and when the stream description is to be activated, the actual list of switch resources is retrieved.

The above-noted parameterized query can also be used to provide an abstract description upload feature in which an abstract description of particular resources of interest is used to determine the particular resource identifiers to be included in a given resource group.

A client or client application may be informed as to the particular members of a given group or groups using a number of different approaches.

For example, the client or client application may receive only a single notification of the particular members comprising a group, i.e., a "one-time" update, or periodic updates informing it as to any changes in the group membership.

In step 502 of FIG. 5, one of the clients 302 asks the telephony server 300 to monitor a specified one of the previously-defined resource groups. Each of the clients 302 is permitted to select particular ones of the defined resource groups for monitoring on its behalf. The defined resource groups are thus selectable by each of a plurality of clients external to the switch 102.

The resource monitor 402 of the telephony server 300 in step 504 of FIG. 5 responds to client selection of a particular resource group or groups by retrieving the group definition(s) from the database 404 and setting up a resource monitoring stream for the requesting client. A resource monitoring stream, in accordance with the present invention, comprises an arrangement whereby the resource monitor 402 directs the monitoring of the selected resources via communication with one or more switches over the switch interface 400, with events characterizing the activities of the monitored resources being returned to the requesting client. The resource monitor 402 in the illustrative embodiment thus permits the selection of one or more previously-defined resource groups by the client 302 and subsequently controls the monitoring of the corresponding resources on behalf of the client.

The selection of one of the previously-defined resource groups in step 502 of FIG. 5 may be implemented via a computer-telephony integration (CTI) application running on the requesting client 302. It is to be appreciated, however, that the invention does not require the use of any particular CTI application or client request format.

As indicated above, the resource group definitions may each be stored with one or more assigned attributes. Such attributes can be used to direct the telephony server 300 to handle the resource monitoring in a particular manner when the corresponding group is selected. The attributes are preferably independent of and combinable with one another. Examples of attributes in accordance with the invention include Preloaded, AppCrashproof and DenyStop.

The Preloaded attribute directs the telephony server to set up the selected monitoring arrangement before the application starts. The monitoring is therefore ready for execution as soon as possible upon selection of the corresponding group.

When the AppCrashproof attribute is present, the monitoring of the corresponding resource group will continue even if the requesting client or client application goes down or otherwise fails. The monitoring is therefore immediately ready when the client or application restarts. With this attribute, if the application is designed to automatically and immediately restart when it crashes, as many applications are, then the monitoring relationships will not be terminated and restarted. Instead, these relationships are maintained, and remain in place and ready to use immediately upon restart.

When the DenyStop attribute is present, the monitoring of the corresponding resource group will continue even if the requesting client indicates that it no longer requires the monitoring, so that the monitoring arrangement is essentially preloaded for another client. The resource monitor 402 in this case may acknowledge a client request to terminate the monitoring, while nonetheless continuing the monitoring without reporting events to that client. This attribute allows the telephony server to keep monitoring relationships up for the interests of many clients. No one client can "tear down" the group.

The above attributes are particularly useful for those clients or client applications that require monitoring of large groups of switch resources. It should be understood that the above attributes are examples only, and numerous other attributes may be associated with a given resource group in accordance with the techniques of the invention.

It should also be emphasized that the particular process flow illustrated in FIG. 5 is exemplary only. A number of other example resource monitoring flow scenarios are specified below:

Scenario A: The telephony server initially sets up a monitoring relationship with the switch, for groups marked with the attribute Preloaded, without any client application request being received.

Scenario B: A client application requests monitoring for a group with no special attributes, and the telephony server establishes monitoring with members of the group.

Scenario C: A client application requests monitoring for a group with the Preloaded attribute, and the telephony server simply acknowledges the request and commences the monitoring without the need for further communication with the switch.

Scenario D: A client application crashes or ends normally, while monitoring a group with the AppCrashproof attribute, and the telephony server keeps the monitoring arrangement in place without requiring that any message be sent to the switch.

Scenario E: A client application indicates that it no longer wants monitoring of a group with the DenyStop attribute, and the telephony server keeps the monitoring arrangement in place without requiring that any message be sent to the switch.

Of course, numerous alternative resource monitoring scenarios are possible utilizing the techniques of the invention.

An advantage of the illustrative embodiment described above with reference to FIGS. 3, 4 and 5 is that the telephony server 300 can monitor multiple diverse communications platforms on behalf of numerous, otherwise unrelated clients. This provides a consistent interface for the clients, and centralized negotiation, control and maintenance of resource monitoring relationships. Moreover, the time required to establish the monitoring on behalf of clients is considerably reduced, particularly for applications monitoring large numbers of resources and upon failure and restart of clients or client applications.

As previously noted, the resource monitoring functions described above in conjunction with the illustrative embodiments of the invention may be implemented in whole or in part in software running on the telephony server 300.

The term "monitoring" as used herein with regard to switch resources is intended to be construed broadly, so as to encompass, by way of example and without limitation, an operation or operations involving control of the switch resources.

It should again be emphasized the above-described embodiments are illustrative only. For example, alternative embodiments may utilize different client, switch and terminal configurations, different types and arrangements of servers, and different resource monitoring stream description formats. These and numerous other alternative embodiments within the scope of the following claims will be apparent to those skilled in the art.

What is claimed is:

1. A method comprising:
    storing information defining one or more resource groups for a switch, wherein:
        (i) each of the resource groups comprises a plurality of identifiers,
        (ii) each of the identifiers specifies at least one resource which is associated with the switch,
        (iii) each of the identifiers is determined in response to a parameterized query based on a description of at least one characteristic of the group,
        (iv) at least one of the resource groups is defined as a result of a flexible query based on an assigned attribute,
        (v) the assigned attribute specifies a relationship between the time period over which resource is to be monitored and the time period over which a client is running, and
        (vi) the client is external to the switch;
    selecting from the client at least one of the resource groups; and
    wherein in response to the selection of one of the groups by the client, monitoring of the corresponding resources is established on behalf of the client.

2. The method of claim 1 wherein the storing step comprises storing the information such that the one or more defined resource groups are selectable by each of a plurality of clients external to the switch.

3. The method of claim 1 wherein the storing step comprises storing the information in a memory element associated with a telephony server coupled between the client and the switch.

4. The method of claim 3 wherein the telephony server comprises a resource monitor for permitting the selection of the resource group by the client and controlling the monitoring of the corresponding resources on behalf of the client.

5. The method of claim 3 wherein the memory comprises a database storing multiple defined resource groups.

6. The method of claim 1 wherein the selection of one of the defined resource groups is implemented via a computer-telephony integration (CTI) application running on the client.

7. The method of claim 1 wherein the assigned attribute indicates that the corresponding resource group will be set up for monitoring prior to selection of the group by the client.

8. The method of claim 1 wherein the assigned attribute indicates that the monitoring of the corresponding resource group will continue even if the requesting client fails.

9. The method of claim 1 wherein the assigned attribute indicates that the monitoring of the corresponding resource group will continue even if the requesting client indicates that it no longer requires the monitoring.

10. The method of claim 1 wherein the description specifies all dialed numbers having the characteristic.

11. The method of claim 1 wherein at least one of the resource groups comprises a fixed set of identifiers.

12. The method of claim 1 wherein at least one of the resource groups comprises a dynamically variable set of identifiers.

13. An apparatus comprising:
    a server connectable between a client and a switch, the server being operative: (i) to store information defining one or more resource groups for the switch, each of the resource groups comprising a plurality of identifiers, each of the identifiers specifying at least one resource to be monitored, the resources specified by said one or more defined resource groups comprising telephony resources utilized by said switch in conjunction with directing one or more of said calls, and (ii) to permit selection, by a client external to the switch, of at least one of the resource groups;

wherein in response to selection of one of the groups by the client, monitoring of the corresponding telephony resources is established on behalf of the client; and wherein at least one of the resource groups is defined as a result of a flexible query based on an assigned attribute;

wherein the assigned attribute specifies a relationship between the time period over which the client requires the monitoring; and wherein the identifiers associated with a given one of the resource groups are determined in response to a parameterized query based on a description of at least one characteristic of the group.

* * * * *